(12) United States Patent
Inose et al.

(10) Patent No.: US 11,753,878 B2
(45) Date of Patent: Sep. 12, 2023

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Keita Inose, Tokyo (JP); Masaaki Sugino, Tokyo (JP); Shin Ugai, Tokyo (JP); Hikari Nakano, Tokyo (JP)

(73) Assignees: NIPPON STEEL CORPORATION, Tokyo (JP); VALLOUREC OIL AND GAS FRANCE, Aulnoye-Aymeries (FR)

(*) Notice: Subject to any disclaimer, the term of this patent is extended or adjusted under 35 U.S.C. 154(b) by 129 days.

(21) Appl. No.: 17/595,328

(22) PCT Filed: Aug. 7, 2020

(86) PCT No.: PCT/JP2020/030407
§ 371 (c)(1),
(2) Date: Nov. 15, 2021

(87) PCT Pub. No.: WO2021/029370
PCT Pub. Date: Feb. 18, 2021

(65) Prior Publication Data
US 2022/0220813 A1    Jul. 14, 2022

(30) Foreign Application Priority Data
Aug. 9, 2019    (JP) .................................. 2019-147926

(51) Int. Cl.
*E21B 17/042*    (2006.01)
*F16L 15/04*    (2006.01)
(Continued)

(52) U.S. Cl.
CPC .......... *E21B 17/0423* (2013.01); *F16L 15/04* (2013.01); *F16L 15/004* (2013.01); *F16L 15/06* (2013.01)

(58) Field of Classification Search
CPC ....... F16L 15/002; F16L 15/04; F16L 15/004; F16L 15/06; E21B 17/0423
See application file for complete search history.

(56) References Cited

U.S. PATENT DOCUMENTS 4,753,460 A * 6/1988 Tung .................... E21B 17/0423
285/331
2012/0043756 A1   2/2012 Elder et al.
(Continued)

FOREIGN PATENT DOCUMENTS

JP        005908905 B2    4/2016
WO     2015194160 A1    12/2015
WO     2017104282 A1    6/2017

*Primary Examiner* — David Bochna
(74) *Attorney, Agent, or Firm* — Greer Burns & Crain Ltd.

(57) ABSTRACT

A two-step threaded connection for steel pipe includes an intermediate seal and intermediate shoulders. A pin 2 has an inner male-threaded section 23 and an outer male-threaded section 26. A box 3 has an inner female-threaded section 33 and an outer female-threaded section 36. The pin 2 has a pin intermediate critical cross section PICCS located near an end of the first male-threaded section 23. The box 3 has a box critical cross section BCCS located near an end of the inner female-threaded section 33 and a box intermediate critical cross section BICCS located near an end of the outer female-threaded section 36.
The pin 2 and the box 3 satisfy the following relationships:

PICCSA+BICCSA>BCCSA, and 0.70≤PICCSA/BICCSA≤0.95.

10 Claims, 2 Drawing Sheets

(51) Int. Cl.
*F16L 15/00* (2006.01)
*F16L 15/06* (2006.01)

(56) References Cited

U.S. PATENT DOCUMENTS

| | | | |
|---|---|---|---|
| 2012/0325361 A1* | 12/2012 | Durivault | F16L 15/004 |
| | | | 138/109 |
| 2014/0084582 A1 | 3/2014 | Elder et al. | |
| 2018/0363813 A1 | 12/2018 | Inose et al. | |
| 2021/0247004 A1* | 8/2021 | Briane | F16L 15/002 |
| 2022/0220813 A1* | 7/2022 | Inose | E21B 17/0423 |

* cited by examiner

THREADED CONNECTION FOR STEEL PIPE

TECHNICAL FIELD

The present disclosure relates to a threaded connection used to connect steel pipes.

BACKGROUND ART

In oil wells, natural-gas wells etc. (hereinafter collectively referred to as "oil wells" or the like), underground resources are mined using casing that forms a plurality of well walls, which form layers, and tubing positioned within the casing to produce oil or gas. Such casing and tubing are constructed by connecting large numbers of steel pipes in series, where threaded connections are used to connect the pipes. Steel pipes used in oil wells are also referred to as oil-well pipes.

Threaded connections are generally categorized as integral type and coupling type.

An integral connection directly connects oil-well pipes. Specifically, a female thread is provided on one end of an oil-well pipe, while a male thread is provided on the other end, and the male thread of one oil-well pipe is screwed into the female thread of another oil-well pipe such that the oil-well pipes are connected.

A coupling-type connection connects oil-well pipes using a tubular coupling. Specifically, a female thread is provided on each end of the coupling, while a male thread is provided on each end of each oil-well pipe. Then, one male thread of one oil-well pipe is screwed into one female thread of the coupling and one male thread of another oil-well pipe is screwed into the other female thread of the coupling such that the oil-well pipes are connected. That is, a coupling-type connection connects a pair of pipes, one of which is an oil-well pipe and the other one is a coupling.

An end portion of an oil-well pipe on which a male thread is provided includes an element to be inserted into a female thread provided on an oil-well pipe or a coupling, and thus is usually referred to as "pin". An end portion of an oil-well pipe or coupling on which a female thread is provided includes an element for receiving a male thread provided on an oil-well pipe, and thus is referred to as "box".

In recent years, deep wells with higher pressures and higher temperatures have been developed. In deep wells, thick-wall oil-well pipes with high pressure resistance are usually used. Further, because addressing the complexity of the formation-pressure distribution according to depth necessitates an increase in the number of layers of the casing, slim-type threaded connections may be used, which have a maximum outer diameter that is substantially equal to the outer diameter of the pipe body of the oil-well pipes. Such thick-wall connections or slim connections are not only required to have high strength and high sealability, but have tight restrictions as to outer diameters imposed to allow multiple layers of oil-well pipes to be positioned.

Thick-wall connections and slim connections with tight size restrictions are often designed to include intermediate shoulder surfaces and an intermediate seal in the middle of the connection as determined along the axial direction and a two-step thread system with male and female threads located forward of and rearward of the intermediate shoulders/seal, as disclosed by Japanese Patent No. 5908905 (Patent Document 1), WO 2017/104282 (Patent Document 2) and WO 2015/194160 (Patent Document 3). In a threaded connection with an inner seal at the tip of the pin, the intermediate seal is mainly intended to ensure sealability against the external pressure.

A threaded connection thus designed has critical cross sections (PICCS and BICCS) in the middle of the connection, as disclosed by Patent Document 1.

A critical cross section (CCS) is a cross section of a connection with a minimum area for bearing a tensile load when the connection is made up. When an excessive tensile load is applied, there is a high possibility that the connection breaks at a critical cross section.

In a connection with male and female threads of a common one-step thread construction, the critical cross section is the cross section of the box along the thread root of the female thread located at that one of the ends of engagement between the male and female threads when the connection is made up which is closer to the tip of the male thread. The ratio of the critical cross-sectional area (CCSA) to the cross-sectional area A of the pipe body of the oil-well pipe, CCSA/A, is known as connection efficiency, and is widely used as an indicator for the tensile strength of a connection relative to the tensile strength of the body of an oil-well pipe. A coupling-type threaded connection is usually designed such that the critical cross-sectional area CCSA of the coupling is larger than the cross-sectional area A of the pipe body of the oil-well pipe and smaller than 110% of the cross-sectional area A of the pipe body.

On the other hand, in a threaded connection of a two-step thread construction, a cross section with only a small area for bearing a tensile load is also present in the middle of the connection as determined along the axial direction as discussed above, and this cross section is known as intermediate critical cross section (ICCS).

PRIOR ART DOCUMENTS

Patent Documents

[Patent Document 1] JP 5908905 B
[Patent Document 2] WO 2017/104282 A1
[Patent Document 3] WO 2015/194160 A1

SUMMARY OF THE INVENTION

Problems to be Solved by the Invention

In a threaded connection of a two-step thread construction with intermediate shoulder surfaces and an intermediate seal, changes in the area of the pin's intermediate critical cross section (PICCS), referred to as PICCSA (Pin Intermediate Critical Cross-Sectional Area), and the area of the box's intermediate critical cross section (BICCS), referred to as BICCSA (Box Intermediate Critical Cross-Sectional Area), result in changes in the ratio of loads distributed among the various critical cross sections when various complex loads act, thus changing the behavior of connection portions at and near the critical cross sections during extensional deformation or bending deformation. This affects the sealability of the intermediate seal between the pin and box critical cross sections.

In arrangements where PICCSA+BICCSA is constant, if PICCSA is too large, this means that BICCSA is too small, which means that, when a tensile load is applied, for example, the amount of extensional deformation of portions of the box near the BICCS is large. As a result, the sealing surface of the intermediate seal of the pin and the sealing surface of the intermediate seal of the box are displaced from each other along the axial direction, reducing the effective amount of seal interference and thus reducing the contact force between the sealing surfaces, reducing sealability. Further, if BICCSA is small, this means that portions of the coupling near the coupling ends have smaller thicknesses than the intermediate shoulder of the coupling, that is, the rigidity of portions at and near the intermediate seal is small, increasing the likelihood of bending deformation etc. of the coupling under a complex load.

On the other hand, if PICCSA is too small, the amount of extensional deformation of pin portions near the PICCS is large. As a result, the sealing surface of the intermediate seal of the pin and the sealing surface of the intermediate seal of the box are displaced from each other along the axial direction, reducing the effective amount of seal interference and thus reducing the contact force between the sealing surfaces, reducing sealability.

In this way, sealability varies depending on not only the total area of the PICCS and BICCS, but also on the distribution of area among the PICCS and BICCS.

Patent Document 1, discussed above, discloses a threaded connection in which the shoulder area is maximized to provide increased torque resistance and, at the same time, the area of the CCS is kept within ±5% relative to the total area of the PICCS and BICCS to maintain balance between the efficiencies of the four critical cross sections to maximize the efficiency of the connection and provide a certain axial performance of the connection.

Patent Document 2, discussed above, discloses providing an appropriate amount of interference between the intermediate shoulder surfaces of the pin and box to ensure sealability and prevent crevice corrosion.

Patent Document 3, discussed above, discloses a pin including a nose immediately extending from the inner sealing surface and located between the inner shoulder surface on the pin tip and the inner sealing surface to ensure that the elastic recovery of the nose amplifies the contact pressure between the inner sealing surfaces, thereby providing high sealability mainly against the internal pressure.

However, none of Patent Documents 1 to 3 discloses effects of the ratio between the areas of the PICCS and BICCS on the sealability of the threaded connection.

An object of the present disclosure is to ensure good sealability in a threaded connection for steel pipe of a two-step thread construction including an intermediate seal and intermediate shoulders.

Means for Solving the Problems

The threaded connection for steel pipe according to the present disclosure is a threaded connection for steel pipe including a tubular pin and a tubular box, the pin and the box being made up as the pin is screwed into the box. The pin may include, in order from a tip of the pin toward a base of the pin: a first male-threaded section; an intermediate seal section; and a second male-threaded section. The pin may further include an intermediate shoulder surface provided between the first male-threaded section and the intermediate seal section of the pin to face the tip. The box may include, in order from an interior of the box onward: a first female-threaded section adapted such that the first male-threaded section of the pin is fitted therein when the connection is made up; an intermediate seal section adapted such that the intermediate seal section of the pin is fitted thereto when the connection is made up; and a second female-threaded section adapted such that the second male-threaded section of the pin is fitted therein when the connection is made up. The box may further include an intermediate shoulder surface provided between the first female-threaded section and the intermediate seal section of the box. The intermediate shoulder surface of the box faces the intermediate shoulder surface of the pin and these shoulder surfaces are facing in an axial direction of the threaded connection. The pin may have a pin intermediate critical cross section located near an end of the first male-threaded section that is located closer to a base (i.e. the end opposite to the end associated with the tip). The box may have a box critical cross section located near an end of the first female-threaded section that is located further toward the interior; and a box intermediate critical cross section located near an end of the second female-threaded section that is located further toward the interior.

Preferably, the pin and the box satisfy the following relationships:

PICCSA+BICCSA>BCCSA, and 0.70≤PICCSA/BICCSA≤0.95, where PICCSA is the area of the pin intermediate critical cross section found when the pin and the box are not made up, BICCSA is the area of the box intermediate critical cross section found when the pin and the box are not made up, and BCCSA is the area of the box critical cross section found when the pin and the box are not made up.

Effects of the Invention

The present disclosure ensures good sealability in a threaded connection for steel pipe of a two-step thread construction including an intermediate seal and intermediate shoulders.

EMBODIMENTS FOR CARRYING OUT THE INVENTION

The threaded connection for steel pipe according to the present embodiment includes a tubular pin and a tubular box. The pin and box are made up as the pin is screwed into the box. The pin may be provided on an end of a steel pipe such as an oil-well pipe. The box may be provided on an end of a coupling or an end of another steel pipe.

The pin may include, in order from its tip onward, a nose section, an inner seal section, an inner male-threaded section, an intermediate shoulder section, an intermediate seal section, and an outer male-threaded section. Alternatively, such nose and/or inner seal section may be absent. Further, the tip surface of the pin forms an inner shoulder surface. If the nose section is present, a tip surface of the nose section forms the inner shoulder surface. In implementations where such a nose section is absent and the tip portion of the pin is constituted by the inner seal section, the tip surface of the inner seal section forms the inner shoulder surface. If neither such a nose section nor such an inner seal section is present, the tip surface of the inner male-threaded section or the tip surface of another portion extending from the inner male-threaded section further in the direction of the tip may form the inner shoulder surface. The inner shoulder surface of the pin faces in the axial direction of the tip.

The inner male-threaded section is provided between the inner seal section and intermediate shoulder section. The inner male-threaded section may have an outer periphery that gradually decreases in diameter toward the tip. A tapered thread that gradually decreases in diameter toward the tip may be provided on the outer periphery of the inner male-threaded section.

The intermediate shoulder section is provided between the inner male-threaded section and intermediate seal section. The intermediate shoulder section may include an intermediate shoulder surface that is perpendicular to the axial direction of the pin or is tapered in shape. The intermediate shoulder surface may face in the axial direction of the tip.

The intermediate seal section is provided between the intermediate shoulder section and outer male-threaded section.

The outer male-threaded section may include an outer periphery that gradually decreases in diameter toward the tip and in which the outer diameter of the end closer to the tip is larger than the outer diameter of the end of the inner male-threaded section closer to the base. A tapered thread that gradually decreases in diameter toward the tip may be provided on the outer periphery of the outer male-threaded section.

The box may include, in order from its interior onward, a recess section corresponding to the nose section of the pin, an inner seal section corresponding to the inner seal section of the pin, an inner female-threaded section corresponding to the inner male-threaded section of the pin, an intermediate shoulder section corresponding to the intermediate shoulder section of the pin, an intermediate seal section corresponding to the intermediate seal section of the pin, and an outer female-threaded section corresponding to the outer male-threaded section of the pin. The recess section may be constructed in such a way that the nose section may be inserted therein when the connection is made up and a clearance is formed between the nose and recess sections. In this case, the interior end surface of the recess section may form the inner shoulder surface. In implementations where the pin does not include a nose section, it is preferable that such a recess section be absent. Further, in implementations where the pin includes no inner seal section, it is preferable that the box include no inner seal section, either.

The inner female-threaded section is provided between the inner seal section and intermediate shoulder section. The inner female-threaded section may have a construction complementary to that of the inner male-threaded section of the pin, and have an inner periphery that gradually decreases in diameter toward the interior of the box. A tapered thread that gradually decreases in diameter toward the interior of the box may be provided on the inner periphery of the inner female-threaded section.

The intermediate shoulder section is provided between the inner female-threaded section and intermediate seal section. The intermediate shoulder section may include an intermediate shoulder surface that is perpendicular to the axial direction of the box or is conical in shape. This intermediate shoulder surface faces the intermediate shoulder surface of the pin, and these surfaces are facing in the axial direction of the threaded connection.

The intermediate seal section is provided between the intermediate shoulder section and outer female-threaded section.

The outer female-threaded section may have a construction complementary to that of the outer male-threaded section of the pin and gradually decrease in diameter toward the interior of the box, and have an inner periphery in which the outer diameter of the end located further toward the interior has a larger outer diameter than the end of the inner female-threaded section located further toward the exterior. A tapered thread that gradually decreases in diameter toward the interior of the box may be provided on the inner periphery of the outer female-threaded section.

When the connection is made up, the nose section of the pin is inserted into the recess section of the box. When the connection is made up, the inner seal section of the pin is fitted into the inner seal section of the box by interference fit. When the connection is made up, the inner male-threaded section of the pin is screwingly fitted into the inner female-threaded section of the box. When the connection is made up, the intermediate shoulder surface of the intermediate shoulder section of the pin faces the intermediate shoulder surface of the intermediate shoulder section of the box, and these surfaces are facing in the axial direction. Preferably, when the connection is made up, the intermediate shoulder surface of the intermediate shoulder of the pin is in contact with the intermediate shoulder surface of the intermediate shoulder of the box. When the connection is made up, the intermediate seal section of the pin is fitted to the intermediate seal section of the box by interference fit. When the connection is made up, the outer male-threaded section of the pin is screwingly fitted into the outer female-threaded section of the box. Preferably, when the connection is made up, the inner shoulder surface of the pin is in contact with the inner shoulder surface of the box.

The pin has a pin intermediate critical cross section located near the end of the tapered inner male-threaded section with a larger diameter. The position of the pin intermediate critical cross section is the one near the end of the inner male-threaded section with a larger diameter that has the smallest cross-sectional area. Typically, the pin intermediate critical cross section is that cross section of the pin on which the load flanks of the inner male- and female-threaded sections come out of contact when the connection is made up.

The box has a box critical cross section located near the end of the tapered inner female-threaded section with a smaller diameter (i.e. further toward the interior of the box) and a box intermediate critical cross section located near the end of the tapered outer female-threaded section with a smaller diameter. The position of the box critical cross section is the one near the end of the inner female-threaded section with a smaller diameter which has the smallest cross-sectional area. Typically, the box critical cross section is that cross section of the box on which the load flanks of the inner male- and female-threaded sections come out of contact when the connection is made up. The position of the box intermediate critical cross section is the one near the end of the outer female-threaded section with a smaller diameter which has the smallest cross-sectional area. Typically, the box intermediate critical cross section is that cross section of the box on which the load flanks of the outer male- and female-threaded sections come out of contact when the connection is made up.

Preferably, the pin and box satisfy the following relationships:

$$PICCSA + BICCSA > BCCSA, \text{ and}$$

$$0.70 \leq PICCSA/BICCSA \leq 0.95,$$

where PICCSA is the area of the pin intermediate critical cross section found when the pin and box are not made up, BICCSA is the area of the box intermediate critical cross section when the pin and box are not made up, and BCCSA is the area of the box critical cross section found when the pin and box are not made up.

In the context of the present disclosure, the various critical cross sections do not include cross sections of the threads themselves of the various taper-threaded sections, and the area of a critical cross section is defined as the cross-sectional area of the pin or box as measured at a position outside the threads in the perfect and imperfect thread areas of a taper-threaded section.

Further, the inner periphery of the pin may have an inner diameter that is substantially constant from the nose section to the inner seal section, inner male-threaded section, intermediate shoulder, intermediate seal section and up to the outer male-threaded section. Each of the inner seal section and nose may have an inner periphery that gradually decreases in diameter toward the tip.

The outer periphery of the box may have an outer diameter that is substantially constant from the inner seal section to the inner female-threaded section, intermediate shoulder, intermediate seal section and up to the outer female-threaded section.

PICCSA/BICCSA is more preferably not less than 0.73, and yet more preferably not less than 0.75.

PICCSA/BICCSA is more preferably not more than 0.91, and yet more preferably not more than 0.90.

According to an embodiment, the axial distance between the pin intermediate critical cross section and intermediate seal of the pin is larger than the axial distance between the box intermediate critical cross section and intermediate seal section of the box. This will reduce the amount of deformation due to the diameter reduction of the intermediate seal section of the box caused by an external pressure acting thereon, which is expected to improve the sealability of the intermediate seal against the external pressure.

Preferably, the pin is provided on an end of the steel pipe, and the box is provided on the coupling. More particularly, the steel pipe includes a pipe body and the pin extends from the end of the pipe body in the axial direction. Pipe body means pipe portions that are not located in the box upon insertion when the connection is made up. In such implementations, it is preferable that the box critical cross-sectional area of the coupling, BCCSA, be larger than the cross-sectional area of the pipe body of the steel pipe, A. This will provide a tensile strength of the threaded connection equal to or larger than the tensile strength of the steel pipe. The present invention may be suitably implemented as a threaded joint for steel pipes of which the pipe body has a thickness not thinner than 20 mm. Here, that the thickness is not thinner than 20 mm means that the minimum thickness of the pipe body is not thinner than 20 mm.

[Construction of Threaded Connection for Steel Pipe]

Figure 1:
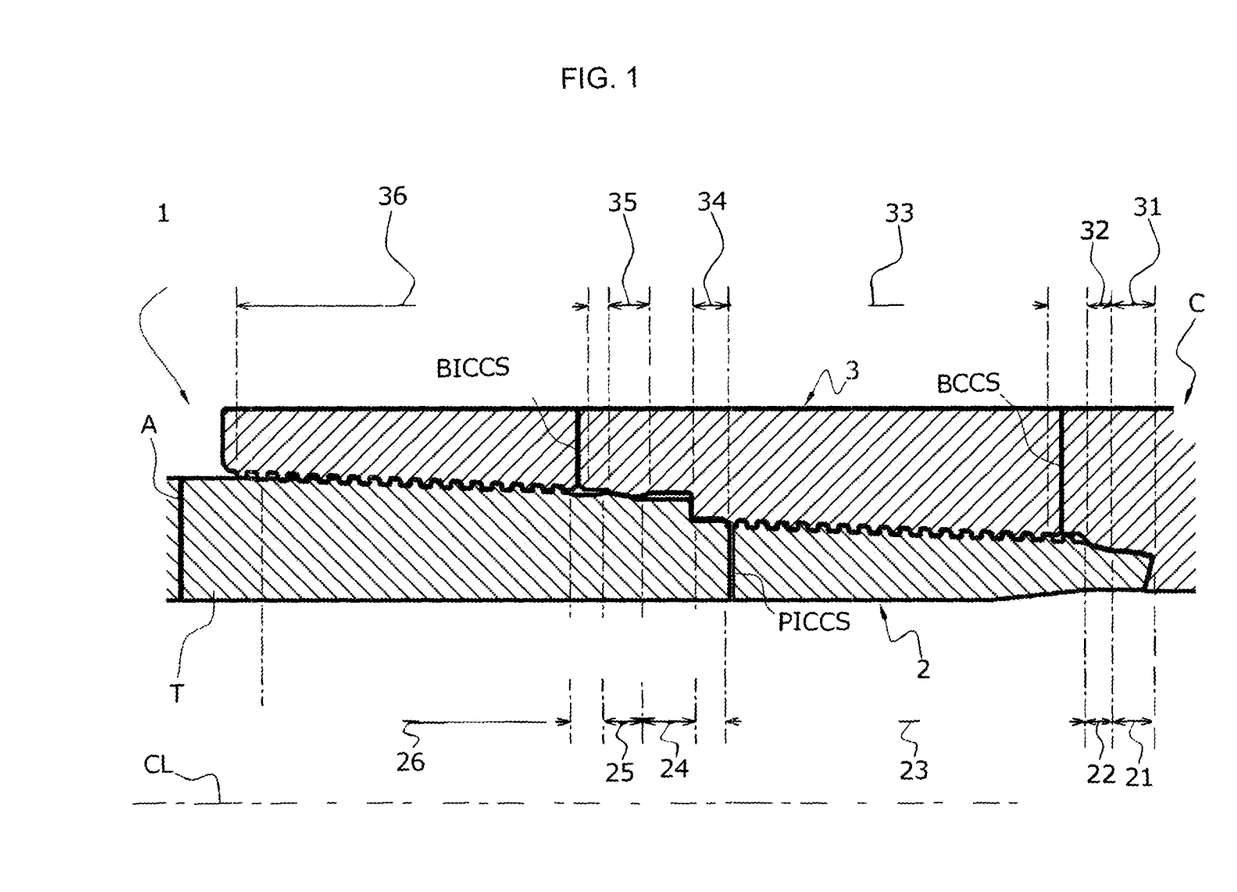
FIG. 1 is a longitudinal cross-sectional view of a threaded connection for steel pipe according to an embodiment.

Referring to FIG. 1, a threaded connection for steel pipe 1 according to the present embodiment is a coupling-type threaded connection that includes a tubular pin 2 and a tubular box 3 adapted to be made up on the pin 2 as the pin 2 is screwed therein. In the implementation shown, the pin 2 is provided on an end of an oil-well pipe T, while the box 3 is provided on an end of a coupling C.

The pin 2 extends in the axial direction from an end of the pipe body of the oil-well pipe T to the tip. The pin 2 includes a nose section 21 (hereinafter referred to as "the nose"), an inner seal section 22, a tapered inner male-threaded section 23, an intermediate shoulder section 24, an intermediate seal section 25, and a tapered outer male-threaded section 26. Each of the sections 21 to 26 is tubular or annular in shape.

The nose 21 is located further in the direction of the tip than the inner seal section 22 is, and forms a tip portion of the pin 2. The outer periphery of the nose 21 extends toward the tip immediately from an inner sealing surface provided on the outer periphery of the inner seal section 22. The outer periphery of the nose 21 may be a tapered surface that gradually decreases in diameter toward the tip. Alternatively, the outer periphery of the nose 21 may have the shape obtained by combining such a tapered surface and the outer periphery of a solid of revolution obtained by rotating a curve such as an arc about the pipe axis CL. The tip surface of the nose 21 forms the inner shoulder surface of the pin 2. This shoulder surface is an annular surface substantially perpendicular to the pipe axis CL, but may be slightly inclined such that its outer periphery is located further toward the tip of the pin 2.

The inner seal section 22 is located closer to the tip than the inner male-threaded section 23. The inner seal section 22 is located between the nose 21 and inner male-threaded section 23. On the outer periphery of the inner seal section 22 is provided the inner sealing surface, which decreases in diameter toward the tip. The shape of a longitudinal cross section of this sealing surface may be a straight line or an arc, or a combination of a straight line and an arc.

The inner male-threaded section 23 is provided between the inner seal section 22 and intermediate shoulder section 24. On the outer periphery of the inner male-threaded section 23 is provided a tapered thread that gradually decreases in diameter toward the tip.

The intermediate shoulder section 24 is provided between the inner male-threaded section 23 and intermediate seal section 25 and, in the construction shown in FIG. 1, located near the middle of the pin 2 as determined along the axial direction. The intermediate shoulder section 24 includes an intermediate shoulder surface substantially perpendicular to the pipe axis CL. The intermediate shoulder surface is constituted by a stepped portion provided on the outer periphery of the pin 2 and located between the inner male-threaded section 23 and intermediate seal section 25. The intermediate shoulder surface faces toward the tip. The intermediate shoulder surface may be slightly inclined such that the outer or inner periphery is located further toward the tip of the pin 2.

The intermediate seal section 25 is provided between the intermediate shoulder section 24 and outer male-threaded section 26. On the outer periphery of the intermediate seal section 25 is provided an intermediate sealing surface that decreases in diameter toward the tip. The shape of a longitudinal cross section of this sealing surface may be a straight line or an arc, or a combination of a straight line and an arc.

On the outer periphery of the outer male-threaded section 26 is provided a tapered thread that gradually decreases in diameter toward the tip. The outer and inner diameters of the end of the outer male-threaded section 26 closer to the basement are substantially equal to the outer and inner diameters of the pipe body of the oil-well pipe T.

The box 3 includes a recess section 31 (hereinafter referred to as "the recess") corresponding to the nose 21, an inner seal section 32 corresponding to the inner seal section 22, a tapered inner female-threaded section 33 corresponding to the inner male-threaded section 23, an intermediate shoulder section 34 corresponding to the intermediate shoulder section 24, an intermediate seal section 35 corresponding to the intermediate seal section 25, and an outer female-threaded section 36 corresponding to the outer male-threaded section 26. Each of the sections 31 to 35 is tubular or annular in shape.

The recess 31 is located further toward the interior than the inner seal section 22. That is, the recess 31 is located in the most interior region in the box 3. When the connection is made up, the nose 21 of the pin 2 is inserted into the recess 31. When the connection is made up, the interior end surface of the recess 31 functions as an inner shoulder surface to be contacted by the inner shoulder surface of the pin 2. Alternatively, when the connection is made up, the inner shoulder surface of the pin 2 and the inner shoulder surface of the box 3 may not be in contact with each other and a clearance may be formed therebetween.

The inner seal section 32 is located further toward the interior than the inner male-threaded section 33. The inner seal section 32 is located between the recess 31 and inner female-threaded section 33. On the inner periphery of the inner seal section 32 is provided an inner sealing surface that decreases in diameter toward the interior of the box (in other words, toward the tip of the pin). The shape of a longitudinal cross section of this sealing surface may be a straight line or an arc, or a combination of a straight line and an arc.

The inner female-threaded section 33 is provided between the inner seal section 32 and intermediate shoulder section 34. On the inner periphery of the inner female-threaded section 33 is provided a tapered thread that gradually decreases in diameter toward the interior of the box.

The intermediate shoulder section 34 is provided between the inner female-threaded section 33 and intermediate seal section 35 and, in the construction shown in FIG. 1, located near the middle of the box 3 as determined along the axial direction. When the connection is made up, the intermediate shoulder section 34 is located closer to the tip than the intermediate shoulder section 24 of the pin 2. The intermediate shoulder section 34 includes an intermediate shoulder surface substantially perpendicular to the pipe axis CL. This intermediate shoulder surface is constituted by a stepped portion provided on the inner periphery of the box 3 and located between the inner female-threaded section 33 and intermediate seal section 35. The intermediate shoulder surface faces the intermediate shoulder surface of the pin 2 and these surfaces are facing in the axial direction. In the implementation shown, the axial length of the intermediate shoulder section 24 of the pin 2 is larger than the axial length of the intermediate shoulder section 34 of the box 3. Alternatively, the axial length of the intermediate shoulder section 34 of the box 3 may be larger than the axial length of the intermediate shoulder 24 of the pin 2.

The intermediate seal section 35 is provided between the intermediate shoulder section 34 and outer female-threaded section 36. On the inner periphery of the intermediate seal section 35 is provided an intermediate sealing surface that decreases in diameter toward the interior of the box. The shape of a longitudinal cross section of this sealing surface may be a straight line or an arc, or a combination of a straight line and an arc.

On the inner periphery of the outer female-threaded section 36 is provided a tapered thread that gradually decreases in diameter toward the interior of the box.

The inner female-threaded section 33 is constructed such that the inner male-threaded section 23 can be screwed therein and, when the connection is made up, they are in tight fitting contact with each other by interference fit. The outer female-threaded section 36 is constructed such that the outer male-threaded section 26 can be screwed therein and, when the connection is made up, they are in tight fitting contact with each other by interference fit. As the pin 2 is screwed in, the inner seal sections 22 and 32 come into contact with each other and, when the connection is made up, they are in tight fitting contact with each other by interference fit. As the pin 2 is screwed in, the intermediate seal sections 25 and 35 also come into contact with each other and, when the connection is made up, they are in tight fitting contact with each other by interference fit. Thus, the inner sealing surfaces of the inner seal sections 22 and 32 as well as the intermediate sealing surfaces of the intermediate seal sections 25 and 35 are strongly pressed together to form metal seals. In a threaded connection of this construction, the tight fitting contact between the inner seal sections 22 and 32 ensures sealability mainly against the internal pressure. The tight fitting contact between the intermediate seal sections 25 and 35 ensures sealability mainly against the external pressure.

As the pin 2 is screwed in, the shoulder surfaces at the tips of the pin 2 and box 3, as well as the intermediate shoulder surfaces of the pin 2 and box 3, come into contact and are pressed together to serve as stops for limiting the screwing in of the pin 2. Alternatively, the connection may be constructed such that one of the tip shoulder surface and intermediate shoulder surface of the pin 2 does not contact the box 3.

When the connection is made up, a clearance is formed between the outer periphery of the nose 21 of the pin 2 and the inner periphery of the recess 31 of the box 3. Thus, even when an excessive tensile load is applied such that the inner sealing surfaces of the pin 2 and box 3 slightly move relative to each other in the axial direction so as to loosen the contact pressure between these inner sealing surfaces, the contact pressure between the inner sealing surfaces of the pin 2 and box 3 is prevented from decreasing as the inner sealing surface of the pin 2 works together with the nose 21 to elastically recover.

As shown in FIG. 1, the pin 2 further includes a pin intermediate critical cross section (PICCS) located near that end of the tapered inner male-threaded section 23 which has a larger diameter (i.e. closer to the basement). The box 3 further includes a box critical cross section (BCCS) located near that end of the tapered inner female-threaded section 33 which has a smaller diameter (i.e. closer to the interior of the box) and a box intermediate critical cross section (BICCS) located near that end of the tapered outer female-threaded section 36 which has a smaller diameter (i.e. closer to the interior of the box). The pin 2 and box 3 are constructed such that the areas of these critical cross sections satisfy the following expressions.

$$PICCSA+BICCSA>BCCSA, \text{ and}$$

$$0.70 \leq PICCSA/BICCSA \leq 0.95. \qquad \text{[Expressions]}$$

In these expressions, PICCSA is the area of the PICCS, BICCSA is the area of the BICCS, and BCCSA is the area of the BCCS.

Further, in the threaded connection of the present embodiment, the axial distance between the pin intermediate critical cross section (PICCS) and intermediate seal section 25 of the pin 2 is larger than the axial distance between the box intermediate critical cross section (BICCS) and intermediate seal section 35 of the box 3. More preferably, the axial distance between the pin intermediate critical cross section (PICCS) and intermediate seal section 25 may be larger than the axial distance between the intermediate shoulder surface and intermediate seal section 25. In implementations where the intermediate sealing surfaces of the intermediate seal sections 25 and 35 come into surface contact, the position on each of these surfaces used in measuring these axial distances may be the midpoint of the range of surface contact as determined along the axial direction.

Further, the box critical cross section BCCSA of the coupling C is larger than the cross-sectional area A of the pipe body of the oil-well pipe T.

[Effects of Threaded Connection for Steel Pipe]

The present embodiment ensures good sealability in a threaded connection for steel pipe of a two-step thread construction including an intermediate seal and intermediate shoulders. The reasons therefor will be discussed in detail below.

Since the total area of the pin intermediate critical cross section (PICCS) and box intermediate critical cross section (BICCS), PICCSA+BICCSA, is larger than the area of the box critical cross section (CCS), BCCSA, a certain tensile strength of the intermediate seal sections 25 and 35 and nearby portions of the threaded connection 1 is provided.

Further, although the pin intermediate critical cross section PICCSA is smaller than the box intermediate critical cross section BICCSA, the presence of the intermediate seal section 25 of the pin 2 between the intermediate shoulder section 24 and outer male-threaded section 26 ensures that the intermediate seal section 25 has a large cross-sectional area, thereby reducing the deformation due to the diameter reduction of the intermediate seal section 25 occurring when a large external pressure is applied.

Further, since the ratio of the area of the pin intermediate critical cross section (PICCS) to the area of the box intermediate critical cross section (BICCS), PICCSA/BICCSA, is not lower than 0.70 and not higher than 0.95, the amount of extension of portions of the pin 2 at and near the pin intermediate critical cross section occurring when a tensile load is applied is substantially equal to the amount of extension of portions of the box 3 at and near the box intermediate critical cross section, thereby preventing the intermediate sealing surface of the pin 2 and the intermediate sealing surface of the box 3 from being displaced from each other as determined along the axial direction, and preventing bending deformation of portions at and near the sealing surfaces to maintain the effective amount of seal interference, preventing a reduction in sealability.

The present disclosure may not only be applied to coupling-type threaded connections, but also to integral threaded connections. Further, no nose may be provided on the tip of the pin. Further, while FIG. 1 shows an embodiment in which the tapered threads of the various threaded sections are trapezoidal threads, the tapered threads may be API round threads, API buttress threads or wedge threads. The present disclosure is not limited to the above-illustrated embodiment, and other various modifications are possible without departing from the spirit of the present disclosure.

EXAMPLES

To verify the effects of the threaded connection for steel pipe according to the present embodiment, numerical analysis simulations were conducted by the elasto-plastic finite element method.

<Test Conditions>

For a coupling-type threaded connection for oil-well pipe, a plurality of test specimens (analysis models) were created with different values of the ratio of the areas of the PICCS and BICCS, i.e. PICCSA/BICCSA, and an elasto-plastic finite element analysis was conducted for each test specimen to compare their performances. Each test specimen was a coupling-type threaded connection having the basic construction shown in FIG. 1. The common test conditions are provided below.

(1) Analysis Models

The analysis models created were two-dimensional axisymmetric models. That is, the threaded sections 23, 26, 33 and 36 did not have a spiral thread construction; instead, two-dimensional axisymmetric models were created that included ring-shaped protruding portions with the same pitch and the same cross-sectional shape as those of the threads of assumed real products, the protruding portions separated by an equal distance. Various treatises and other publications have proved that values of sealability from FEM analysis results based on such two-dimensional axisymmetric models can be regarded equivalent to the values of sealability of assumed real products.

(2) Dimensions of Steel Pipes

7⅝ [inch]×1.06 [inch] (with an outer diameter of 193.7 [mm] and a wall thickness of 27.0 [mm])

(3) Grade of Steel Pipes

P110 in accordance with API standards (low-alloy steel with a nominal yield stress of 110 [ksi])

To perform FEM analysis, each test specimen was modeled in such a way that the material was an elasto-plastic object with isotropic hardening; the elastic coefficient was 210 [GPa]; and the yield strength was 110 [ksi] (758.3 [MPa]) for 0.2% proof stress.

(4) Dimensions of Threads Assumed in Two-Dimensional Axisymmetric Models thread pitch: 5.08 mm
flank angle of load flank: −3°
flank angle of stab flank: 10°
stab-flank clearance: 0.15 mm (5) Critical Cross-Sectional Area of Box (BCCSA)

106% of cross-sectional area A of pipe body of steel pipe

<Evaluation Method>

For each test specimen, the tightening of the threads was simulated for analysis before a repeated complex load simulating the ISO 13679 2011 Series A test was applied to the model which was made up, to evaluate sealability.

Sealability was evaluated based on the smallest one of the values obtained by dividing, by the applied internal pressure, the contact force per unit length measured along the circumferential direction of the inner sealing surfaces of the pin and box during the internal-pressure cycle portions of the repeated-load history (i.e. quadrants I and II), and was also evaluated based on the smallest one of the values obtained by dividing, by the applied external pressure, the contact force per unit length measured along the circumferential direction of the intermediate sealing surfaces of the pin and box during the external-pressure cycle portions of the repeated-load history (i.e. quadrants III and IV). Larger values mean better sealabilities of the sealing surfaces. Sealability was evaluated using the following two levels relative to the performance of test specimen #9 (the ratio of the area of the PICCS to the area of BICCS, i.e. PICCSA/BICCSA, being 1) during the internal and external cycle portions, which is represented by 1.000:

○: the sealability against the internal pressure was not lower than 1.000 and the sealability against the external pressure was not lower than 1.100; and x: the sealability against the internal pressure was lower than 1.000 or the sealability against the external pressure was lower than 1.100.

Table 1 shows a summary of the test conditions and evaluations for the various test specimens.

TABLE 1

| | | ICCSA [mm²] | Ratio of ICCSA | Ratio of PICCSA + BICCSA | PICCSA/ BICCSA | Load cycle | Sealability | Eval. |
|---|---|---|---|---|---|---|---|---|
| #1 | Pin | 7727.224 | 0.546 | 1.19 | 0.84 | external | 1.144 | ○ |
| | Box | 9158.889 | 0.647 | | | internal | 1.009 | |
| #2 | Pin | 7427.757 | 0.525 | 1.17 | 0.81 | external | 1.135 | ○ |
| | Box | 9158.889 | 0.647 | | | internal | 1.009 | |
| #3 | Pin | 7075.942 | 0.500 | 1.15 | 0.77 | external | 1.135 | ○ |
| | Box | 9158.889 | 0.647 | | | internal | 1.009 | |
| #4 | Pin | 6720.343 | 0.475 | 1.12 | 0.73 | external | 1.135 | ○ |
| | Box | 9158.889 | 0.647 | | | internal | 1.018 | |
| #5 | Pin | 6366.752 | 0.450 | 1.10 | 0.70 | external | 1.117 | ○ |
| | Box | 9158.889 | 0.647 | | | internal | 1.018 | |
| #6 | Pin | 7727.224 | 0.546 | 1.17 | 0.87 | external | 1.144 | ○ |
| | Box | 8843.869 | 0.625 | | | internal | 1.009 | |
| #7 | Pin | 7727.224 | 0.546 | 1.15 | 0.91 | external | 1.126 | ○ |
| | Box | 8488.780 | 0.600 | | | internal | 1.009 | |
| #8 | Pin | 7727.224 | 0.546 | 1.12 | 0.95 | external | 1.126 | ○ |
| | Box | 8136.267 | 0.575 | | | internal | 1.009 | |
| #9 | Pin | 7727.224 | 0.546 | 1.10 | 0.99 | external | 1.000 | x |
| | Box | 7782.341 | 0.550 | | | internal | 1.000 | |
| #10 | Pin | 5499.800 | 0.389 | 1.04 | 0.60 | external | 1.045 | x |
| | Box | 9158.889 | 0.647 | | | internal | 1.018 | |

Test specimens #1 to #8 are examples according to the present disclosure, while test specimens #9 and #10 are comparative examples. Test specimens #2 to #5 and #10 share the same box with test specimen #1 but have different pin dimensions. Test specimens #6 to #9 share the same pin with test specimen #1 but have different box dimensions. The terms in the table are defined as follows:

"Pin": pin; "Box": box; "ICCSA": intermediate critical cross-sectional area of pin and box; "Ratio of ICCSA": ratio of intermediate critical cross-sectional area to cross-sectional area A of pipe body of steel pipe; "Ratio of PICCSA+ BICCSA": sum of ratio of pin intermediate critical cross-sectional area and ratio of box intermediate critical cross-sectional area of each test specimen; "PICCSA/BICCSA": ratio of pin intermediate critical cross-sectional area to box intermediate critical cross-sectional area of each test specimen; "Load Cycle": type of load-cycle portion; "external": external-pressure cycle portion; "internal": internal-pressure cycle portion; "Sealability": sealability; and "Eval.": evaluation results.

The values of the cross-sectional areas and the area ratios in Table 1 were obtained when the pin and box were not made up.

Figure 2:
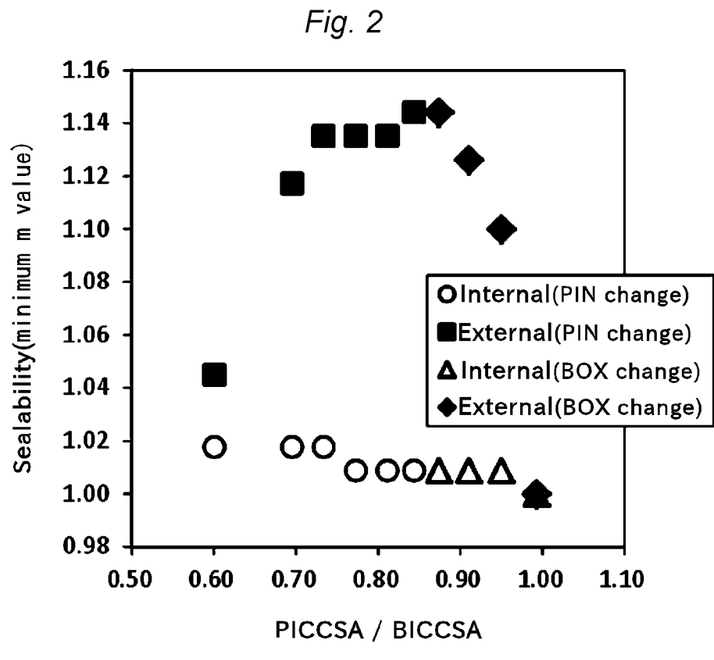
FIG. 2 graphs the relationship between the ratio of the pin intermediate critical cross-sectional area to the box intermediate critical cross-sectional area, on one hand, and evaluated sealability, on the other.
Figure 3:
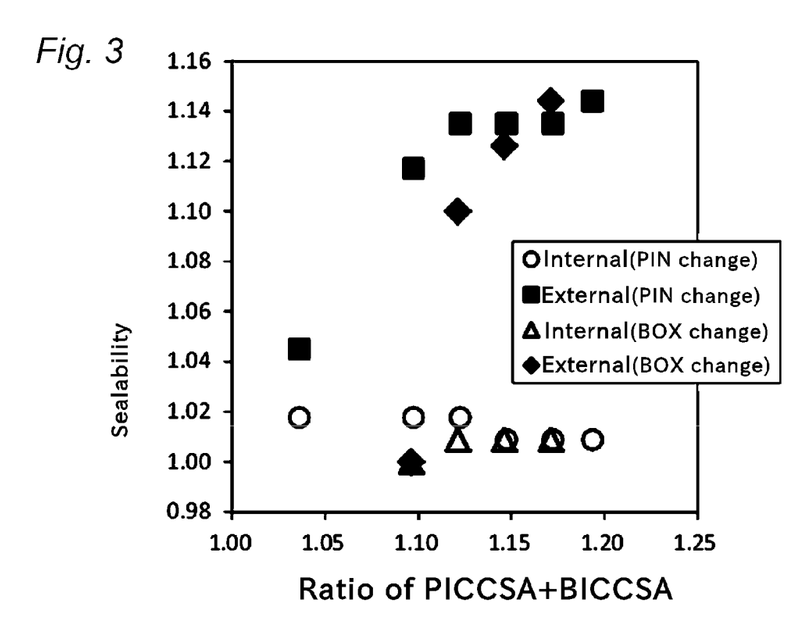
FIG. 3 graphs the relationship between the sum of the ratio of the pin intermediate critical cross-sectional area and the ratio of the box intermediate critical cross-sectional area relative to the cross-sectional area of the pipe body of the steel pipe, on one hand, and evaluated sealability, on the other.

Based on the test results shown in Table 1, FIG. 2 graphs the relationship between the ratio of the pin intermediate critical cross-sectional area to the box intermediate critical cross-sectional area, on one hand, and sealability, on the other. FIG. 3 graphs the relationship between the sum of the ratios of the intermediate critical cross-sectional areas of the pin and box, on one hand, and sealability, on the other.

As will be clear from FIG. 2, when PICCSA/BICCSA was not lower than 0.70 and not higher than 0.95, the sealability against the external pressure increased to 1.10 and above, which means a significant improvement; particularly, the sealability against the external pressure was maintained at 1.13 or above when PICCSA/BICCSA was not lower than 0.73 and not higher than 0.91. Such high sealabilities against the external pressure were only provided by test specimens #1 to #8, in which the sum of PICCSA and BICCSA was larger than the box critical cross-sectional area (106% of the cross-sectional area A of the pipe body of the steel pipe, as discussed above), and PICCSA/BICCSA was not lower than 0.7 and not higher than 0.95, which is presumably why the amount of deformation at and near the intermediate seals was small, providing good sealability.

For test specimen #9, PICCSA+BICCSA was larger than the box critical cross-sectional area, but PICCSA/BICCSA was larger than 0.95, which is presumably why the amount of deformation at and near the intermediate seal was large and good sealability was not obtained.

For test specimen #10, PICCSA+BICCSA was smaller than the box critical cross-sectional area and PICCSA+ BICCSA was smaller than 0.7, which is why the amount of deformation at and near the intermediate seal was large and good sealability was not obtained.

These results demonstrate that the present disclosure provides good sealability against internal and external pressures in a threaded connection for steel pipe of a two-step thread construction including an intermediate seal.

EXPLANATION OF REFERENCES

2: pin; 21: nose; 22: first seal section; 23: first male-threaded section; 24: intermediate shoulder section; 25: second seal section; 26: second male-threaded section;
3: box; 31: recess; 32: third seal; 33: first female-threaded section; 34: intermediate shoulder section; 35: fourth seal section; 36: second female-threaded section;
PICCS: pin intermediate critical cross section; PICCSA: pin intermediate critical cross-sectional area;
BICCS: box intermediate critical cross section; BICCSA: box intermediate critical cross-sectional area; BCCS: box critical cross section; BCCSA: box critical cross-sectional area;
A: cross-sectional area of pipe body of steel pipe

The invention claimed is:

1. A threaded connection for steel pipe comprising a tubular pin and a tubular box, the pin and the box being made up as the pin is screwed into the box, wherein:

the pin includes, in order from a tip of the pin toward a base of the pin: a first male-threaded section; an intermediate seal section; and a second male-threaded section, the pin further includes an intermediate shoulder surface provided between the first male-threaded section and the intermediate seal section of the pin to face the tip;

the box includes, in order from an interior of the box onward: a first female-threaded section adapted such that the first male-threaded section of the pin is fitted therein when the connection is made up; an intermediate seal section adapted such that the intermediate seal section of the pin is fitted thereto when the connection is made up; and a second female-threaded section adapted such that the second male-threaded section of the pin is fitted therein when the connection is made up, the box further includes an intermediate shoulder surface provided between the first female-threaded section and the intermediate seal section of the box, the intermediate shoulder surface of the box facing the intermediate shoulder surface of the pin, these shoulder surfaces facing in an axial direction of the threaded connection;

the pin has a pin intermediate critical cross section located near an end of the first male-threaded section that is located closer to a base;

the box has a box critical cross section located near an end of the first female-threaded section that is located further toward the interior; and a box intermediate critical cross section located near an end of the second female-threaded section that is located further toward the interior; and the pin and the box satisfy the following relationships:

$$PICCSA+BICCSA>BCCSA, \text{ and}$$

$$0.70 \leq PICCSA/BICCSA \leq 0.95,$$

where PICCSA is the area of the pin intermediate critical cross section found when the pin and the box are not made up, BICCSA is the area of the box intermediate critical cross section found when the pin and the box are not made up, and BCCSA is the area of the box critical cross section found when the pin and the box are not made up.

2. The threaded connection for steel pipe according to claim 1, wherein PICCSA/BICCSA is not lower than 0.73.

3. The threaded connection for steel pipe according to claim 2, wherein PICCSA/BICCSA is not higher than 0.91.

4. The threaded connection for steel pipe according to claim 1, wherein the pin further includes an inner seal section located closer to the tip than the first male-threaded section, the box further includes an inner seal section located further toward the interior than the first male-threaded section is, and the inner seal section of the pin is fitted to the inner seal section of the box when the connection is made up.

5. The threaded connection for steel pipe according to claim 4, wherein the pin further includes a nose section located closer the tip than the inner seal section of the pin, the box further includes a recess section located further toward the interior than the inner seal section of the box, and the nose section is inserted into the recess section when the connection is made up.

6. The threaded connection for steel pipe according to claim 1, wherein the pin further includes an inner shoulder surface constituted by a tip surface of the pin, and the box further includes an inner shoulder surface positioned to face the inner shoulder surface of the pin, these surfaces facing in the axial direction.

7. The threaded connection for steel pipe according to claim 1, wherein the pin extends from an end of a pipe body of the steel pipe in the axial direction to the tip, and the box is provided on a coupling.

8. The threaded connection for steel pipe according to claim 7, wherein the box critical cross-sectional area BCCSA of the coupling is larger than a cross-sectional area A of the pipe body of the steel pipe.

9. The threaded connection for steel pipe according to claim 8, wherein the pipe body has a thickness not thinner than 20 mm.

10. The threaded connection for steel pipe according to claim 1, wherein PICCSA/BICCSA is not higher than 0.91.

* * * * *